(12) United States Patent  
Lee et al.

(10) Patent No.: US 12,515,619 B2  
(45) Date of Patent: Jan. 6, 2026

(54) SENSOR CLEANING DEVICE

(71) Applicants: HYUNDAI MOTOR COMPANY, Seoul (KR); KIA CORPORATION, Seoul (KR)

(72) Inventors: Bosung Lee, Ansan-si (KR); Buyeol Ryu, Hwaseong-si (KR); Wonkyu Choi, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 342 days.

(21) Appl. No.: 18/243,502

(22) Filed: Sep. 7, 2023

(65) Prior Publication Data

US 2024/0149836 A1 May 9, 2024

(30) Foreign Application Priority Data

Nov. 7, 2022 (KR) .......................... 10-2022-0146905

(51) Int. Cl.
- *B60S 1/56* (2006.01)
- *B60S 1/52* (2006.01)
- *B60S 1/54* (2006.01)

(52) U.S. Cl.
CPC . *B60S 1/56* (2013.01); *B60S 1/52* (2013.01); *B60S 1/54* (2013.01)

(58) Field of Classification Search
None
See application file for complete search history.

(56) References Cited

U.S. PATENT DOCUMENTS

| 2011/0073142 A1* | 3/2011 | Hattori | .................... B60S 1/481 |
| | | | 134/198 |
| 2018/0272998 A1* | 9/2018 | Schmidt | ................ B05B 7/2424 |
| 2018/0354469 A1* | 12/2018 | Krishnan | ........... G02B 27/0006 |

* cited by examiner

*Primary Examiner* — Cristi J Tate-Sims  
(74) *Attorney, Agent, or Firm* — Lempia Summerfield Katz LLC

(57) ABSTRACT

A sensor cleaning device includes: a spray nozzle configured to spray washing water and air to a sensor; a first flow path having a venturi section that exerts a venturi effect in a midstream thereof and configured to guide air from an air supply source to the spray nozzle; a second flow path configured to provide fluid communication between a washing water supply source and the venturi section such that washing water is suctioned into the venturi section by the venturi effect and combines the washing water from the washing water supply source with a flow of air guided to the spray nozzle; a third flow path configured to communicate with the first flow path to bypass the venturi section; and a valve device configured to control a flow of fluid flowing along the first, second, and third flow paths to a blocking mode, a washing water supply mode, and an air supply mode.

17 Claims, 14 Drawing Sheets

SENSOR CLEANING DEVICE

CROSS-REFERENCE TO RELATED APPLICATION(S)

This application claims the benefit of and priority to Korean Patent Application No. 10-2022-0146905, filed on Nov. 7, 2022, the entire contents of which are incorporated herein by reference.

BACKGROUND

Technical Field

The present disclosure relates to a sensor cleaning device.

Background Art

Recently, the rapid development of the electronic industry has led to the significant development of various sensor technologies. In particular, in the automobile field, various sensor technologies for recognizing objects or detecting relationships with objects have been developed due to the advent of autonomous vehicles. Among the sensors employed in vehicles, notable examples include camera sensors and light detecting and ranging (LiDAR) sensors.

Such sensors are often installed on the vehicle such that lenses or lens covers are exposed to the outside of the vehicle in order to increase the detection effect. However, the lenses or lens covers of the sensors exposed to the outside of the vehicle may be susceptible to contamination by external foreign substances. Consequently, various devices have been developed for cleaning foreign substances that may accumulate on the sensors.

Some sensor cleaning devices use, for example, a method of spraying washing water and air onto sensors. Such sensor cleaning devices may first spray washing water toward a sensor lens or a lens cover to remove foreign substances, and secondarily spray air to remove moisture accumulated on a surface of the sensor lens or lens cover.

In many cases, sensor cleaning devices using a method of spraying washing water and air are equipped with separate passages and a driver source for supplying washing water, as well as passages and a driver source for supplying air. In addition, to prevent issues such as dew condensation or freezing, the passages and the driver source for supplying washing water may be provided with additional features including a heater, such as a heating wire, to prevent dew condensation or freezing.

SUMMARY

An aspect of the present disclosure is to provide a sensor cleaning device configured for simplifying a supply structure of sprayed water and air for sensor cleaning.

Another aspect of the present disclosure is to provide a sensor cleaning device configured for effectively preventing dew condensation or freezing from occurring on supply passages of water sprayed for sensor cleaning without using a heater.

Additional aspects of the present disclosure are set forth in part in the description which follows and, in part, should be understood from the description, or may be learned by practice of the disclosure.

In accordance with an embodiment of the present disclosure, a sensor cleaning device includes a spray nozzle configured to spray washing water and air onto a sensor. The sensor cleaning device further includes a first flow path having a venturi section that exerts a venturi effect in a midstream portion thereof and configured to guide air from an air supply source to the spray nozzle. The sensor cleaning device further includes a second flow path configured to provide fluid communication between a washing water supply source and the venturi section such that washing water is suctioned into the venturi section by the venturi effect and combines the washing water from the washing water supply source with a flow of air guided to the spray nozzle. The sensor cleaning device further includes a third flow path configured to provide fluid communication with the first flow path to bypass the venturi section. The sensor cleaning device also includes a valve device configured to control a flow of fluid flowing along the first, second, and third flow paths to perform any one mode of multiple modes. The modes may include: a blocking mode in which a supply of washing water and air to the spray nozzle is blocked; a washing water supply mode in which the supply of washing water and air to the spray nozzle is allowed; and an air supply mode in which the supply of air is allowed while the supply of the washing water to the spray nozzle is blocked.

The valve device may block the first flow path and the third flow path in the blocking mode.

In the washing water supply mode, the valve device may open the first flow path and the second flow path and block the third flow path.

The air supply mode may further include a first air supply mode in which the first flow path and third flow path are open and the second flow path is blocked. The air supply mode may further include a second air supply mode in which the first flow path and the second flow path are blocked and the third flow path is open.

The sensor cleaning device may further include a contamination detection device configured to detect contamination of the sensor. The valve device may maintain the blocking mode until the contamination of the sensor is detected by the contamination detection device. The washing water supply mode and the air supply mode are then sequentially performed.

The first flow path may include a first upstream pipe forming an upstream path thereof and a first downstream pipe having the venturi section and forming a downstream path thereof. The second flow path may include a second upstream pipe forming an upstream path thereof and a second downstream pipe forming a downstream path thereof. The second downstream pipe of the second flow path may be connected to the first downstream pipe at a position downstream of the venturi section. The third flow path may include a third upstream pipe forming an upstream path thereof and connected to a midstream portion of the first upstream pipe. The third flow path may also include a third downstream pipe forming a downstream path thereof and connected to the first downstream pipe at a position downstream of the venturi section. The valve device may include a valve member and a valve body having an accommodating space to accommodate the valve member. The valve body may include a plurality of first coupling holes formed on one side of the accommodating space so that downstream ends of the first upstream pipe, the second upstream pipe, and the third upstream pipe are thereby coupled to the valve body, respectively. The valve body may also include a plurality of second couplings holes formed on another side of the accommodating space so that upstream ends of the first downstream pipe, the second downstream pipe, and the third downstream pipe are thereby coupled to the valve body, respectively. The plurality of second coupling holes may be formed to correspond to positions of the plurality of first coupling holes. The valve member may include at least one pair of communication holes through which the first coupling holes and the second coupling holes communicate with each other. The valve member may be is rotatably accommodated in the accommodating space.

The plurality of first coupling holes, the plurality of second coupling holes, and the pair of communication holes may be disposed to form 90-degree intervals from each other along a circumference of a rotation center of the valve member.

The valve device may further include a valve driver configured to rotate and drive the valve member by 90 degrees in one direction in order to switch among the multiple modes.

The valve driver may include a solenoid valve having a coil and a plunger. The plunger may move in one direction by electromagnetic interaction with the coil to rotate the valve member when power is applied to the coil. The valve driver may also include a return member configured to elastically support the plunger and return the plunger to an original position in a state in which power to the coil is cut off.

The valve member may be provided in a rectangular plate shape inclined so that a lower part of one side thereof is positioned higher than a lower part of the other thereof in a state in which any one of the multiple modes is maintained. The plunger may be positioned at the lower part of one side of the valve member when any one of the multiple modes is maintained and may be configured to push the lower part of one side of the valve member upward when the mode is switched.

The plunger may further include a body for moving the valve member and an extension portion bent and extending from the body to block contact the valve member. The return member may elastically support the extension portion.

A first locking portion and a second locking portion may be provided on an outer surface of the valve member and an inner surface of the accommodating space, respectively, to engage with each other. Additionally, the first locking portion and the second locking portion may be configured to engage with each other in a state of maintaining any one of the multiple modes so that a posture of the valve member is maintained.

The engagement between the first locking portion and the second locking portion may be released by a rotational force of the valve member rotated by the plunger.

The valve device may further include a pressing member configured to press and support a side of the valve member. The valve device may include an elastic member configured to elastically support the pressing member in a direction of the valve member. The pressing member may press and rotate the valve member such that a posture of the valve member is switched to a state where one of the multiple modes is maintained when a mode switching of the valve member is completed.

The pressing member may include a pressure surface configured to support and press the side of the valve member. The pressing member may also include an inclined surface configured to rotatably support a corner of the valve member to guide the side of the valve member to be supported on the pressure surface.

A first locking portion and a second locking portion may be provided on an outer surface of the valve member and an inner surface of the accommodating space, respectively, to engage with each other. The first locking portion and the second locking portion may be configured to engage with each other in a state of maintaining any one of the multiple modes so that a posture of the valve member is maintained. The pressing member may press and rotate the valve member so that the first locking portion and second locking portion are engaged with each other.

The sensor cleaning device may further include a distributor disposed between the spray nozzle and the first flow path. The spray nozzle may include a plurality of spray nozzles to clean a corresponding plurality of sensors. The plurality of spray nozzles may be branched from the distributor.

BRIEF DESCRIPTION OF THE DRAWINGS

These and/or other aspects of embodiments of the disclosure should be apparent and more readily appreciated from the following description of the embodiments, taken in conjunction with the accompanying drawings, in which.

Figure 1:
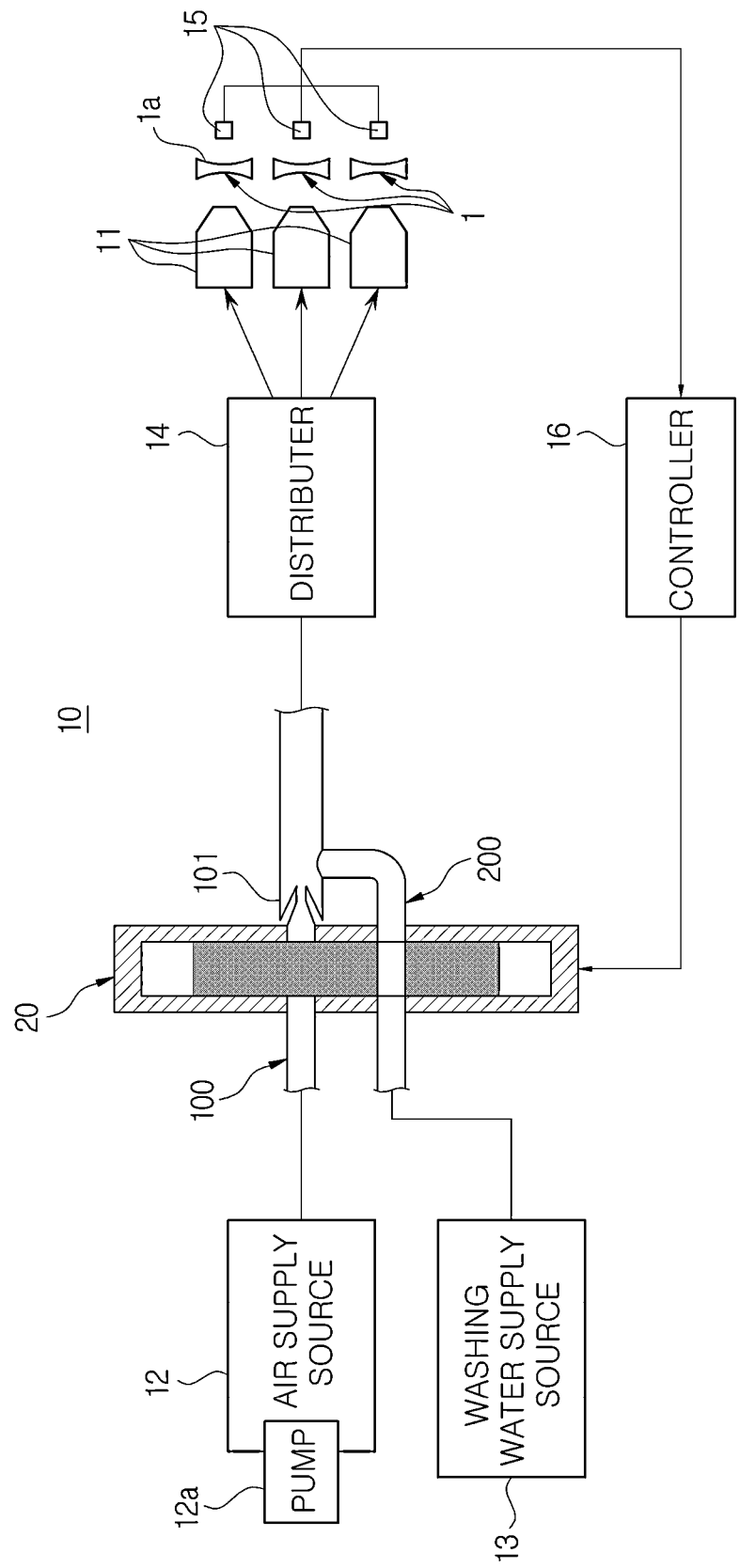
FIG. 1 is a view illustrating a sensor cleaning device according to an embodiment of the present disclosure.
Figure 2:
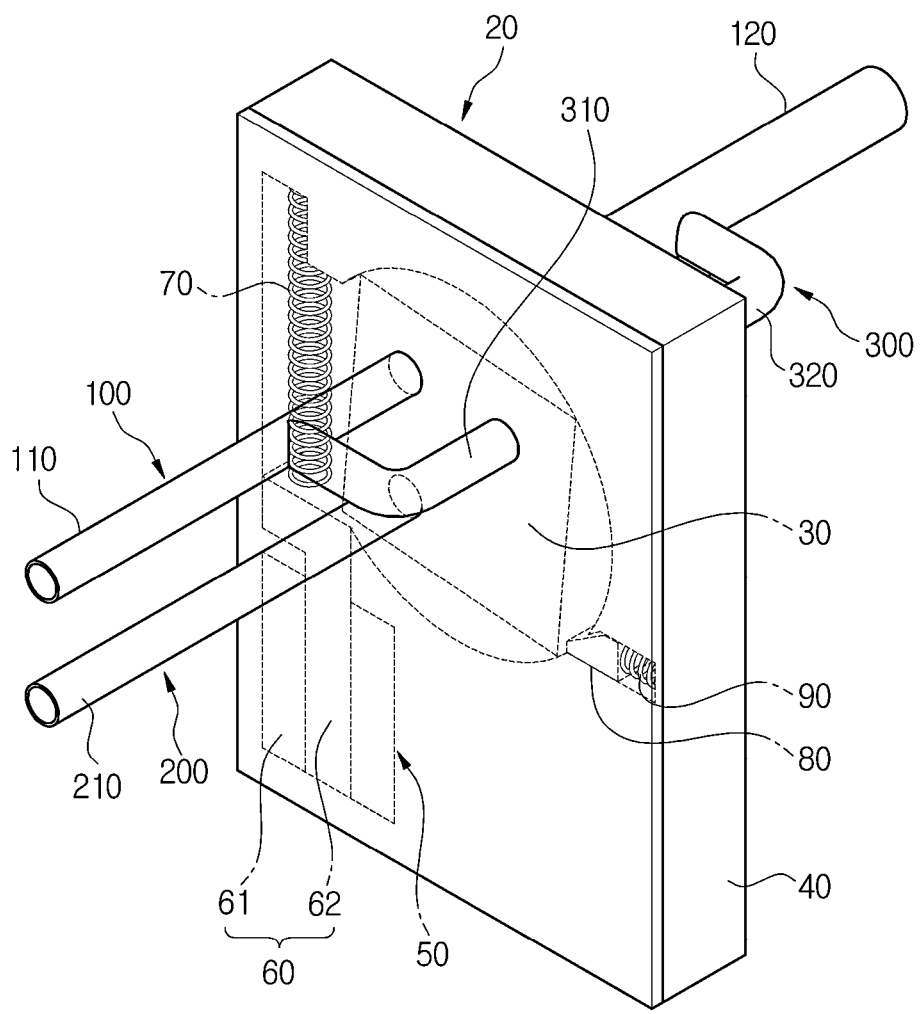
FIG. 2 is a perspective view illustrating a valve device and flow paths of a sensor cleaning device according to an embodiment of the present disclosure.
Figure 3:
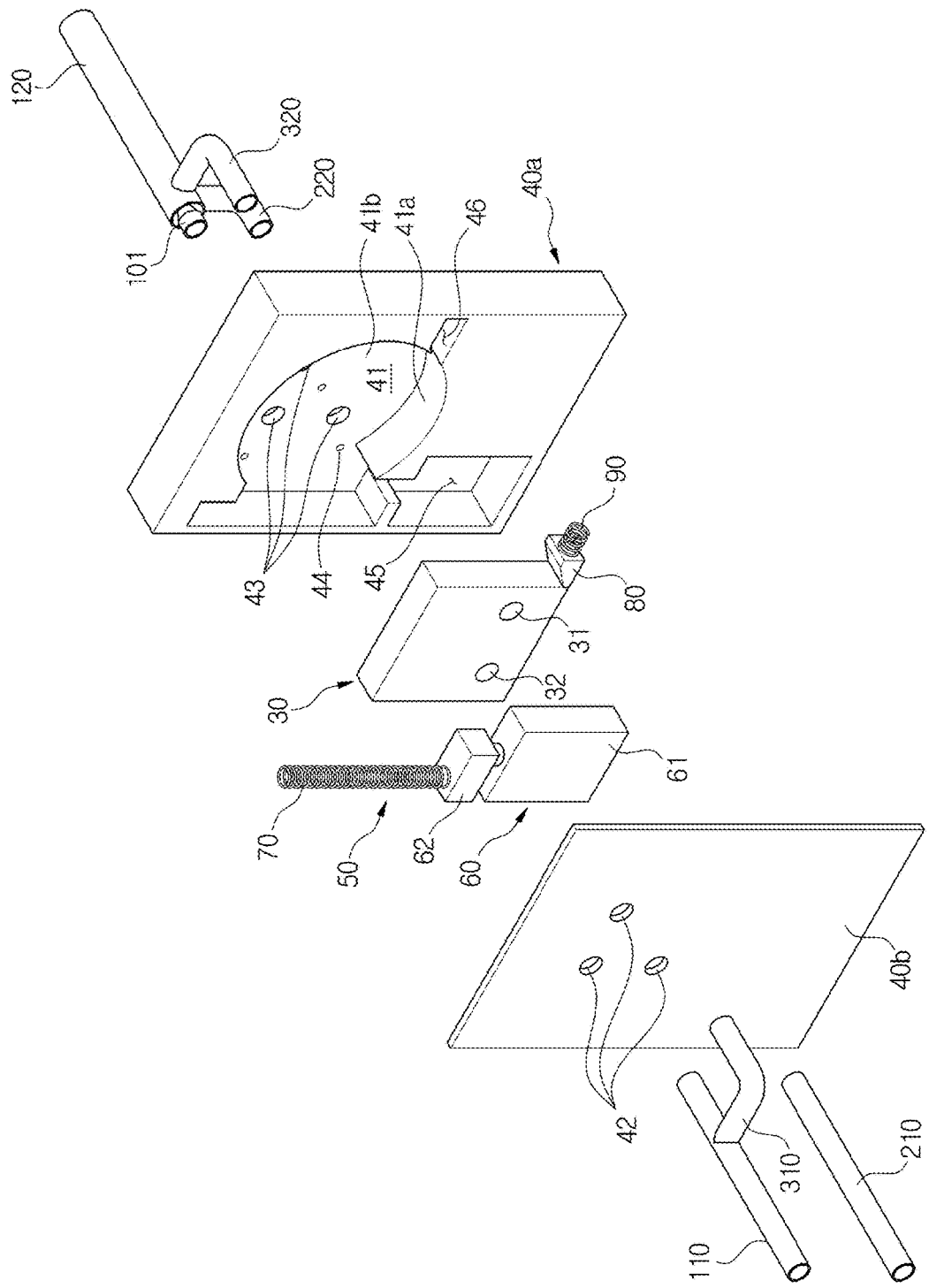
FIG. 3 is an exploded perspective view illustrating a valve device and flow paths of a sensor cleaning device according to an embodiment of the present disclosure.
Figure 4:
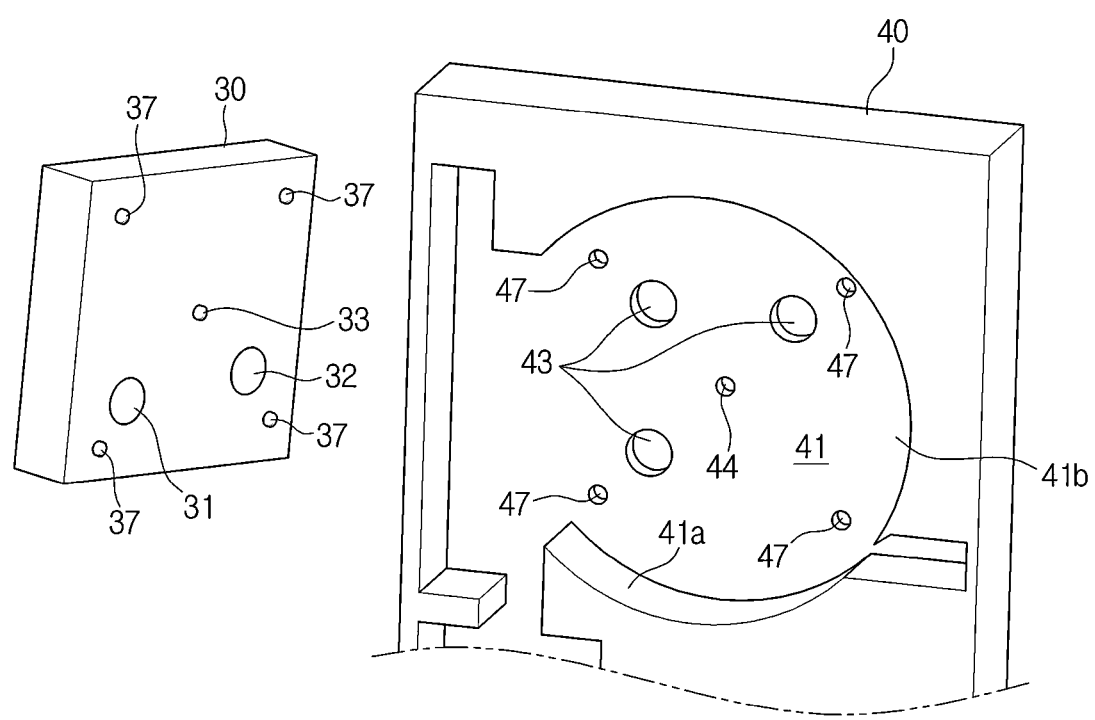
FIG. 4 is a perspective view illustrating the main parts of a valve member and a valve body in a sensor cleaning device according to an embodiment of the present disclosure.
Figure 5:
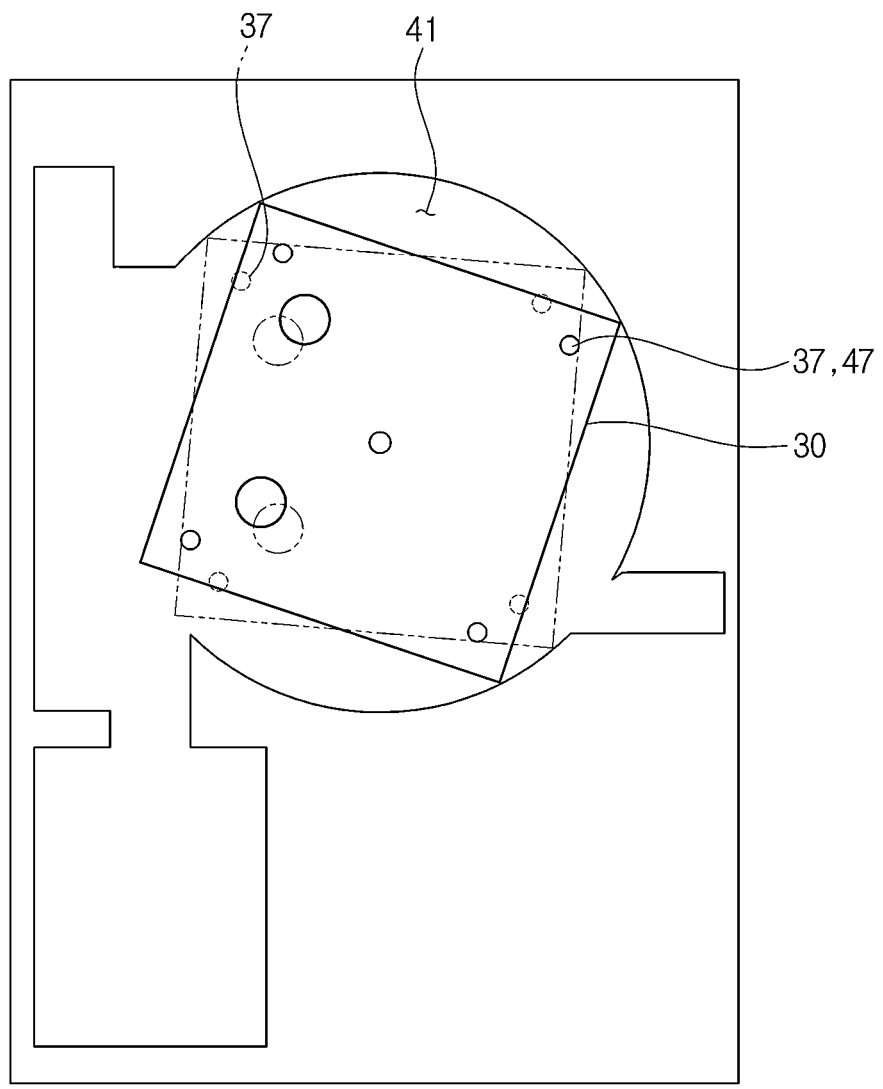
FIG. 5 is a front view illustrating a valve device of a sensor cleaning device according to an embodiment of the present disclosure.

The drawings described herein are for illustration purposes only and are not intended to limit the scope of the present disclosure in any way.

DETAILED DESCRIPTION

The following description is provided with example embodiments and is not intended to limit the present disclosure, application, or uses. It should be understood that, throughout the drawings, corresponding reference numerals indicate like or corresponding parts and features.

Reference is made below in detail to the embodiments of the disclosure, examples of which are illustrated in the accompanying drawings. This specification does not describe all elements of the disclosed embodiments. Detailed descriptions of what is well known in the art or redundant descriptions on substantially the same configurations have been omitted. The terms 'part,' 'module,' 'member,' 'block,' and the like as used in the specification may be implemented in software or hardware. Further, a plurality of 'part,' 'module,' 'member,' 'block,' and the like may be embodied as one component. It is also possible that one 'part,' 'module,' 'member,' 'block,' and the like includes a plurality of components.

Throughout the specification, when an element is referred to as being "connected to" another element, it may be directly or indirectly connected to the other element. When an element is referred to as being "indirectly connected to" another element, it may be connected to the other element with further elements therebetween or via a wireless communication network.

Also, it is to be understood that the terms "include" and "have" and variations thereof are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in context.

The reference numerals used in operations are used for descriptive convenience and are not intended to describe the order of operations. Additionally, the operations may be performed in a different order unless otherwise stated.

When a component, device, element, or the like of the present disclosure is described as having a purpose or performing an operation, function, or the like, the component, device, or element should be considered herein as being "configured to" meet that purpose or to perform that operation or function.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the disclosure are described in detail with reference to the accompanying drawings.

As shown in FIGS. 1-6E, a sensor cleaning device 10 according to an embodiment of the disclosure is a device for cleaning a sensor 1. The sensor 1 is cleaned by using a spray nozzle 11 to spray washing water and air onto the lens or sensor cover of the sensor 1.

The sensor 1 may, for example, be a camera sensor or an optical sensor. The optical sensor may include a light detecting and ranging (LiDAR) sensor. The camera sensor is used to recognize an object through an image obtained by photographing the object. The LiDAR sensor may include a sensor used to detect a distance, direction, speed, and the like of an object by using a method of irradiating a laser to a target.

One or more sensors 1 may include a lens 1a or a lens cover covering the lens 1a. The sensor cleaning device 10 may clean the lens 1a or the lens cover of the sensors 1 by spraying washing water and air via corresponding spray nozzles 11.

One or more sensors 1 may be applied to a vehicle and the sensor cleaning device 10 may be installed around a location of the vehicle on which the sensors 1 are installed.

Hereinafter, a case in which the sensor 1 and the sensor cleaning device 10 are applied to a vehicle is described.

The sensor 1 may be provided so that the lens 1a is exposed to the outside of the vehicle. The sensor cleaning device 10 may be installed in the vehicle to spray washing water and air onto the lens 1a of the sensor 1.

A direction and position of the sensor 1, which is to be cleaned using the sensor cleaning device 10, is not limited to a direction and position of the lens 1a or the lens cover disclosed herein. The sensor cleaning device 10 may be applied to clean various parts of the sensor 1 that may deteriorate detection performance or appearance quality of the sensor 1, such as areas around the lens 1a or around the lens cover.

The sensor cleaning device 10 may include a first flow path 100 configured to guide air from an air supply source 12 and pumped by a pump 12a to the spray nozzle or nozzles 11. The sensor cleaning device 10 may also include a second flow path 200 configured to guide washing water supplied from a washing water supply source 13 to the first flow path 100. The air supply source 12 and the washing water supply source 13 may be provided as tanks or storage reservoirs.

The first flow path 100 has a venturi section 101 exerting the venturi effect middle stream along the first flow path 100. The second flow path 200 may connect the washing water supply source 13 to the venturi section 101 of the first flow path 100 so that washing water is suctioned into the venturi section 101 by the venturi effect.

Accordingly, washing water supplied from the washing water supply source 13 may join a flow of air guided to a spray nozzle 11 through the first flow path 100 and in turn be supplied to the spray nozzle 11. As a result, the sensor cleaning device 10 may supply washing water and air to the spray nozzle 11 by using only the pump 12a provided in the air supply source 12 as a driving source. Thus, an air supply structure may be simplified and accordingly the overall configuration may also be simplified.

Furthermore, the sensor cleaning device 10 may include a third flow path 300 connected to the first flow path 100 in order to bypass the venturi section 101.

The third flow path 300 allows air from the air supply source 12 to be guided to the spray nozzle 11 without passing through the venturi section 101, if necessary, thereby increasing the spray action (e.g., pressure or volume) of the air sprayed to the sensor 1. Details regarding this are described below.

The sensor cleaning device 10 may include a valve device 20 that controls a flow of fluid flowing along the first flow path 100, the second flow path 200, and the third flow path 300.

The valve device 20 may perform various fluid flow modes. These modes may include: a blocking mode in which the supply of washing water and air to the spray nozzle 11 is blocked; a washing water supply mode in which the supply of washing water and air to the spray nozzle 11 is allowed; and an air supply mode in which the supply of air is allowed while the supply of washing water is blocked. As a result of the various modes, a cleaning efficiency of the sensor 1 may be improved by using washing water and air.

The first flow path 100 guides washing water or air to a distributor 14 and one or more of the spray nozzles 11 may branch from the distributor 14. For example, in the embodiment shown, three spray nozzles 11 are depicted.

Additionally, the sensors 1 installed in the vehicle may be composed of three sensors, and the three spray nozzles 11 are arranged in a position to provide washing water and air to each of the three sensors 1 installed in the vehicle, respectively. Thus, the lenses 1a or lens covers of each sensor 1 may be cleaned.

Some of the three sensors 1 may be disposed in the front of the vehicle, and the remaining sensors 1 may be disposed in the rear of the vehicle. The lenses 1a of these sensors 1 are exposed to the outside of the vehicle and the plurality of spray nozzles 11 may be respectively disposed to spray washing water and air toward the lenses 1a of each sensor 1.

Relative to the valve device 20, the first flow path 100 may include a first upstream pipe 110 forming an upstream path and a first downstream pipe 120 forming a downstream path. The second flow path 200 may include a second upstream pipe 210 forming an upstream path and a second downstream pipe 220 forming a downstream path. The third flow path 300 may include a third upstream pipe 310 forming an upstream path and a third downstream pipe 320 forming a downstream path.

The third upstream pipe 310 may be connected to a middle portion of the first upstream pipe 110 so that the first upstream pipe 110 and the third upstream pipe 310 are fluidly connected. In addition, the first downstream pipe 120 has the venturi section 101 at an upstream end thereof, i.e, close to the valve device 20. The second downstream pipe 220 may be connected to one side of the first downstream pipe 120 at a position downstream of the venturi section 101. Furthermore, the third downstream pipe 320 may be connected to the other side of the first downstream pipe 120 at a position downstream of the venturi section 101. As a result, a configuration in which some of the plurality of pipes 110, 120, 210, 220, 310, and 320 are connected to each other to form one body allows a configuration of the first flow path 100, the second flow path 200, and the third flow path 300 to be simplified.

The valve device 20 may include a valve member 30 and a valve body 40 having an accommodating space 41 to accommodate the valve member 30. The valve body 40 may include a main body 40a and a cover 40b. The accommodating space 41 may be provided at an inner space of the main body 40a.

The valve body 40 has a plurality of first coupling holes 42 formed on one side, i.e., the upstream side, of the accommodating space 41. The downstream ends of the first upstream pipe 110, the second upstream pipe 210, and the third upstream pipe 310 are coupled, respectively, to the corresponding ones of the first coupling holes 42. Furthermore, the valve body 40 has a plurality of second coupling holes 43 formed on the other side, i.e., the downstream side, of the accommodating space 41. The upstream ends of the first downstream pipe 120, the second downstream pipe 220, and the third downstream pipe 320 are coupled, respectively, to the corresponding ones of the second coupling holes. The first coupling holes 42 may be formed in the cover 40b and the second coupling holes 43 may be formed in the main body 40a. The plurality of first coupling holes 42 and the plurality of second coupling holes 43 may be formed such that positions thereof correspond to each other.

The valve member 30 is provided with at least one pair of communication holes 31 and 32 capable of selectively communicating the first coupling holes 42 with the second coupling holes 43. The valve member 30 may be rotatably accommodated in the accommodating space 41 to change the position of the communication holes 31 and 32 relative to the first and second coupling holes. The pair of communication holes 31 and 32 may be classified into a first communication hole 31 and a second communication hole 32.

The valve device 20 as described above includes one valve member 30 that is rotatably installed in the valve body 40 to smoothly control the flow of washing water and air flowing along the flow paths 100, 200, and 300.

The valve body 40 may be provided in a rectangular plate shape, and the accommodating space 41 may be provided inside the valve body 40. The accommodating space 41 is provided in a disk shape or a shape close to a disc. Additionally, the valve member 30 may be accommodated in the accommodating space 41 such that each corner is rotatably supported on a support surface 41a of the circumference of the accommodating space 41. The valve member 30 has a rotation protrusion 33 forming a rotation center at the center of one outer surface of the valve member 30. A coupling bore, hole, or groove 44 may be disposed at the center of an inner surface 41b of the accommodating space 41, such that the rotation protrusion 33 is rotatably coupled thereto or received therein.

The plurality of first coupling holes 42, second coupling holes 43, and communication holes 31 and 32 may be arranged at 90-degree intervals from each other along the circumference of the rotation center of the valve member 30, respectively. Accordingly, as the communication holes 31 and 32 rotate by 90 degrees while the valve member 30 rotates at 90-degree intervals, the coupling holes 42 and 43 aligned and in flow communication with the communication holes 31 and 32 are changed. As a result, the fluid flow mode flowing along the flow paths 100, 200, and 300 may be switched.

The valve device 20 may include a valve driver 50 that rotates and drives the valve member 30 by 90 degrees in one direction in order to switch the flow mode of the fluid. In addition, the sensor cleaning device 10 may include a contamination detection device 15 for detecting contamination of the sensor 1.

The valve driver 50 operates to maintain the blocking mode until contamination of the sensor 1 is detected through the contamination detection device 15. The washing water supply mode and the air supply mode are then sequentially performed. Thus, the flow mode of the fluid may be switched sequentially.

The contamination detection device 15 may be provided as a sensor configured for detecting the presence or absence of foreign substances on the lens 1a. A contamination detection signal of the lens 1a detected through the contamination detection device 15 is transmitted to a controller 16. The controller 16 may control an operation of the valve driver 50 based on the contamination detection signal.

The valve driver 50 may include a solenoid valve 60. The solenoid valve 60 may include a coil 61 and a plunger 62 that rotates the valve member 30 by moving in one direction by electromagnetic interaction with the coil 61 when power is applied to the coil 61.

The solenoid valve 60 may contribute to simplifying the configuration of the valve driver 50 by rotating the valve member 30 using the plunger 62. The plunger 62 may be configured to move the valve member 30 in one direction.

The valve driver 50 elastically supports the plunger 62 and includes a return member 70 that returns the plunger 62 to its original position in a state in which the power to the coil 61 is cut off. Accordingly, when the plunger 62 performs one reciprocating motion, the valve driver 50 allows the valve member 30 to be rotated by 90 degrees. The return member 70 may be provided as a spring.

At one side of the accommodating space 41, an installation groove or cavity 45 may be disposed inside the valve body 40 to communicate with the accommodating space 41 in order to install the valve driver 50 therein.

Furthermore, the valve member 30 may be provided in a rectangular plate shape that is inclined so that a lower part of one side is positioned higher than a lower part of the other side in a state in which the fluid flow mode is maintained. In addition, the plunger 62 is positioned at the lower part of one side of the valve member 30 when the fluid flow mode is maintained. The plunger 62 is configured to push the lower part of one side of the valve member 30 upward when the fluid flow mode is switched, allowing valve member 30 to rotate immediately.

The plunger 62 may include a body 62a for moving the valve member 30 and may include an extension portion 62b that is bent and extends from the body 62a so as to block contact with the valve member 30. The return member 70 is configured to elastically support the extension portion 62b and may perform a returning operation of the plunger 62. Accordingly, the returning operation of the return member 70 does not interfere with by the valve member 30.

Furthermore, on the outer surface of the valve member 30, first locking portions 37 are provided on the circumference of the rotation center of the valve member 30. Additionally, on the inner surface 41b of the accommodating space 41 supporting the outer surface of the valve member 30, second locking portions 47 are provided to engage or catch the first locking portions 37.

The first locking portions 37 and the second locking portions 47 are configured to interlock or engage with or catch each other maintaining the selected fluid flow mode. Thus, a selected posture or orientation of the valve member 30 may be stably maintained.

The first locking portions 37 and the second locking portions 47 may be provided as protrusions capable of engaging each other. Alternatively, one may be provided as a protrusion and the other may be provided as a groove, bore, recess, etc. into which the protrusion is received or inserted and captured.

Multiple first locking portions 37 and second locking portions 47 may be provided to maintain the posture of the valve member 30 rotated to tilt or be oriented in each fluid flow mode.

The first locking portions 37 and the second locking portions 47 may be configured to allow rotation of the valve member 30 by the plunger 62. To this end, the engagement between the first locking portions 37 and the second locking portions 47 may be released by the rotational force of the valve member 30 rotated by the plunger 62.

In addition, the valve device 20 may include a pressing member 80 that, through pressure, supports the side of the valve member 30 that is on the opposite side of the valve member 30 that faces the valve driver 50. Furthermore, the valve device 20 may include an elastic member 90 that elastically supports the pressing member 80 in the direction of the valve member 30. The elastic member 90 may be provided as a spring.

The pressing member 80 is configured to press and rotate the valve member 30 such that the posture or orientation of the valve member 30 is switched or rotated to a titled or reoriented state in which the selected fluid flow mode is maintained, at a time when the switching of the fluid flow mode of the valve member 30 is completed.

The pressing member 80 presses and rotates the valve member 30 so that the first locking portions 37 and the second locking portions 47 are engaged. As a result, the valve member 30 maintains the selected titled or rotated state.

The pressing member 80 may include a pressure surface 81 for supporting and pressing the side of the valve member 30. The pressing member 80 may further include an inclined surface 82 rotatably supporting the corner of the valve member 30 in order to guide the side of the valve member 30 to be supported on the pressure surface 81.

Accordingly, the pressing member 80 may ensure a rotational motion of the valve member 30 so that the rotational motion of the valve member 30 is smooth. In addition, the pressuring member 80 may prevent the valve member 30 from moving freely in the accommodating space 41 of the valve body 40. In other words, the valve member 30 is positioned in a titled posture or orientation in the selected fluid flow mode, and the pressing member 80 may prevent the valve member 30 from moving freely so that the valve member 30 maintains the titled posture.

An installation groove or cavity 46 may be provided inside the valve body 40 at the other side of the accommodating space 41 to communicate with the accommodating space 41 in order to install the pressing member 80 and the elastic member 90.

FIGS. 6A-6E are views illustrating a process in which the fluid flow mode is switched by the valve device 20 sequentially.

Figure 6A:
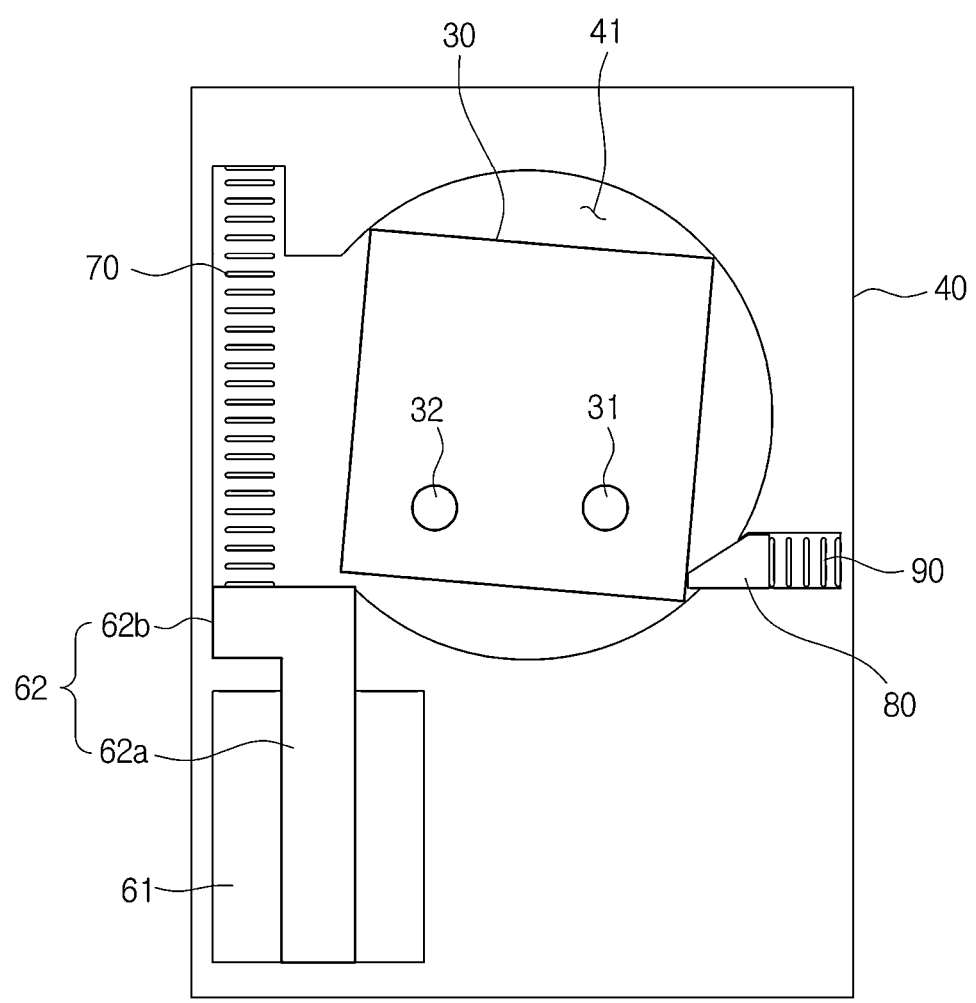
FIGS. 6A-6E are views sequentially illustrating a process in which a fluid flow mode is switched through a valve device in a sensor cleaning device according to an embodiment of the present disclosure.
Figure 6B:
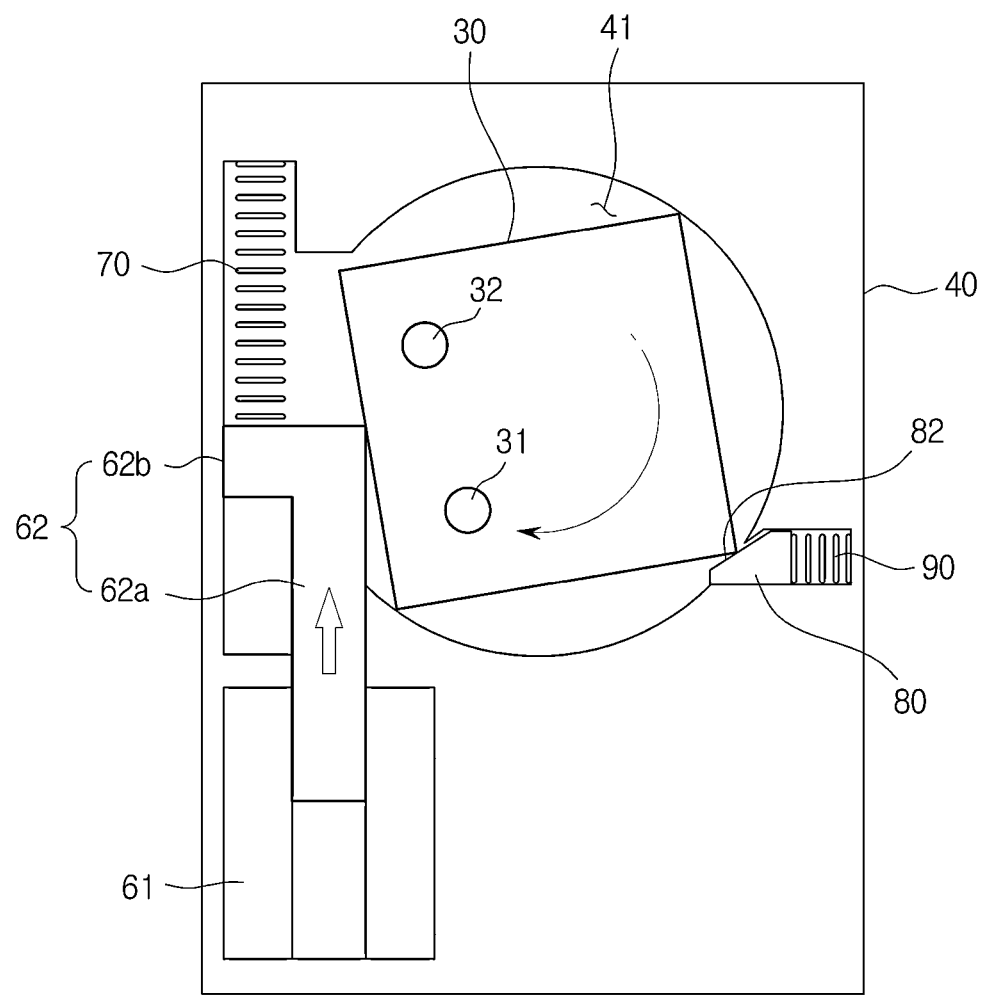
Figure 6C:
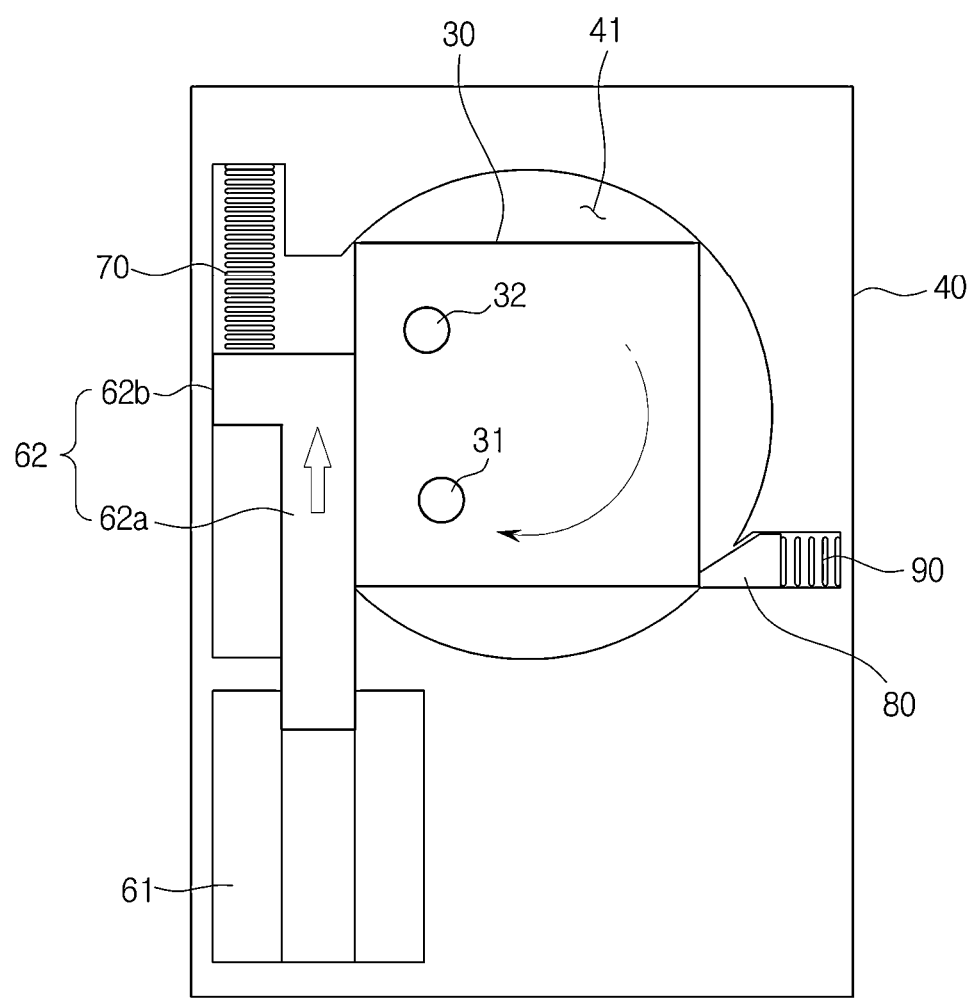
Figure 6D:
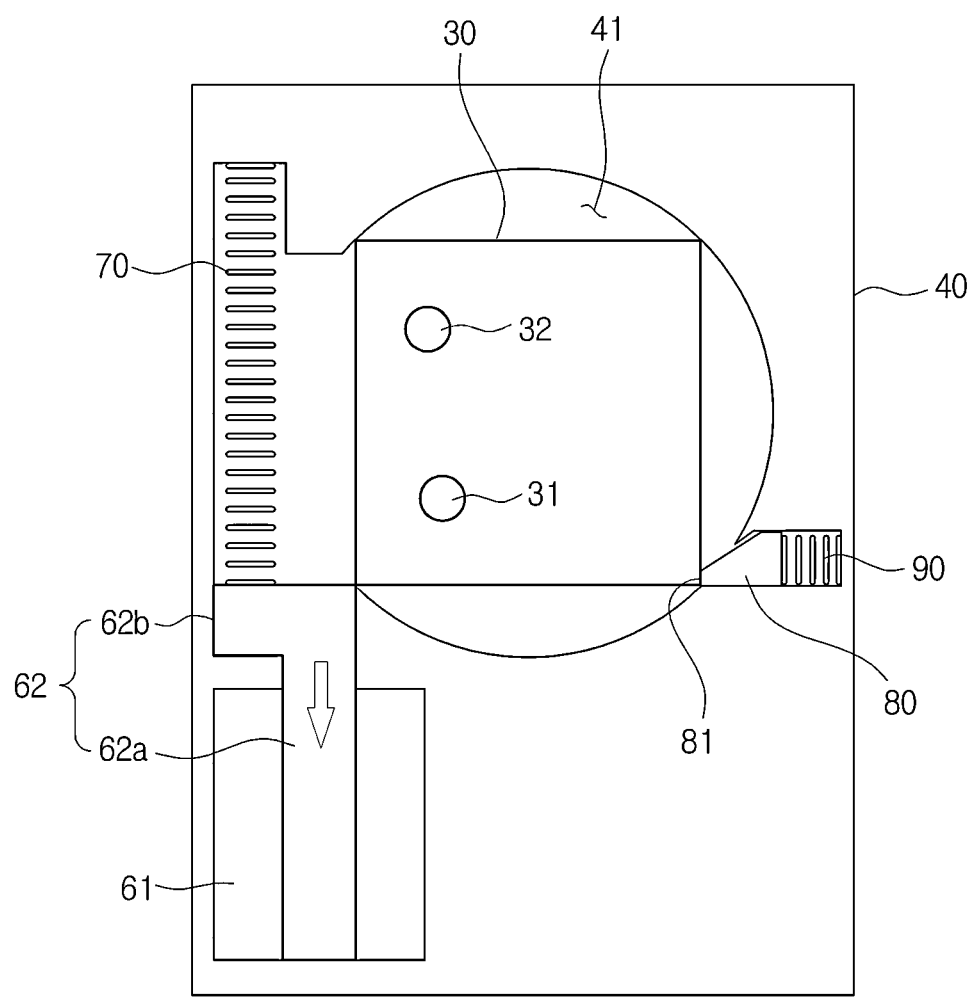
Figure 6E:
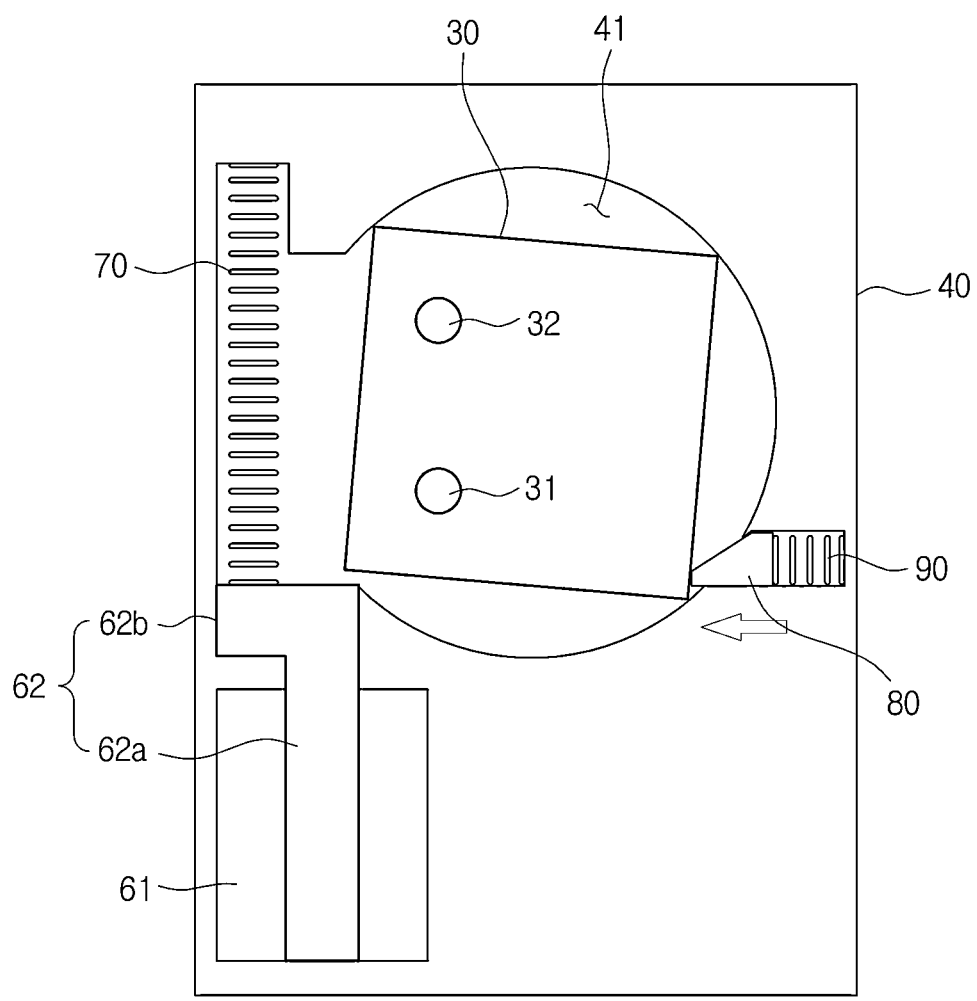

FIG. 6A shows the blocking mode. FIG. 6B shows a state when power is applied to the coil 61 of the solenoid valve 60. As shown in FIG. 6B, the plunger 62 moves upward while compressing the return member 70 to rotate the valve member 30 clockwise. In this state, the lower right corner of the valve member 30, rotating clockwise, may be supported on the inclined surface 82 of the pressing member 80. As the inclined surface 82 supports the corner of the valve member 30 to guide the rotation of the valve member 30, the side of the valve member 30 is supported by the pressing surface 81 of the pressing member 80. At this time, the elastic member 90 is compressed, and the valve member 30 is supported by the plunger 62 while in a vertical state. When the power applied to the coil 61 of the solenoid valve 60 is cut off, as shown in FIG. 6D, the plunger 62 is moved downward of the valve member 30 by the restoring force of the return member 70. As shown in FIG. 6E, the pressing member 80 may press the side of the valve member 30 through the restoring force of the elastic member 90. Accordingly, the valve member 30 in the blocking mode may be rotated 90 degrees clockwise to switch the fluid flow mode to the washing water supply mode of FIG. 6E. The valve member 30 may maintain this state until power is applied to the coil 61 of the solenoid valve 60 again.

The flow mode of the fluid may be switched to the washing water supply mode, the air supply mode, and the blocking mode in sequential order by the operation of the valve member 30, sequentially rotating at 90-degree intervals in the clockwise direction.

Figure 7:
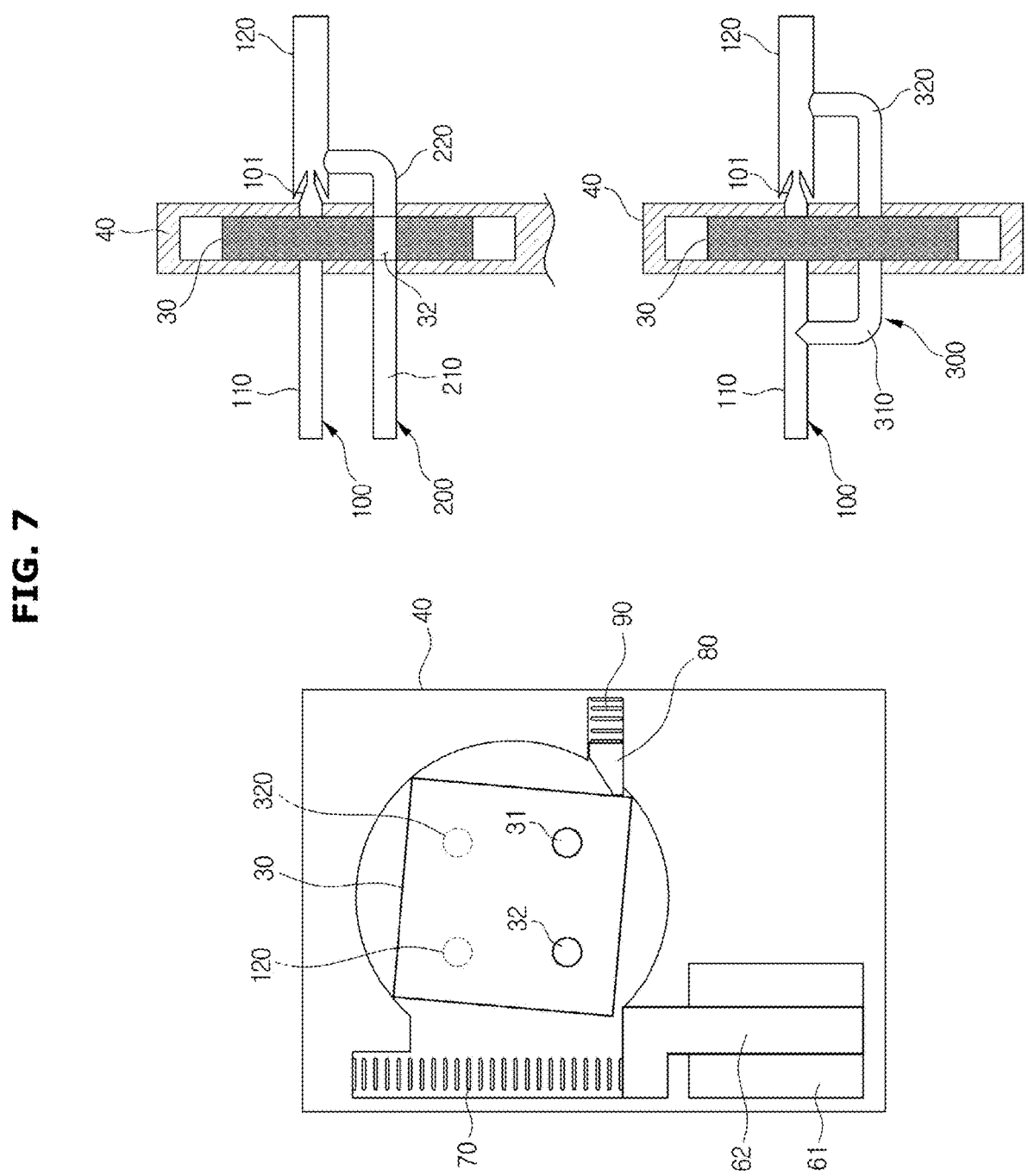
FIG. 7 is a view illustrating a case in which the fluid flow mode is a blocking mode in a sensor cleaning device according to an embodiment of the present disclosure.

FIG. 7 illustrates a structure of the state in which the valve device 20 has switched the fluid flow mode to the blocking mode. In this mode and orientation, the first and second communication holes 31, 32 are positioned at a lower portion, i.e., a bottom facing side portion, of the valve member 30.

As shown in FIG. 7, the valve member 30 maintains a state in which the first communication hole 31 and the second communication hole 32 are positioned at a lower portion of the valve member 30, i.e., on both sides of the lower facing part. Accordingly, fluid communication between the first upstream pipe 110 and the first downstream pipe 120 and fluid communication between the third upstream pipe 310 and the third downstream pipe 320 may be blocked through an upper portion of the valve member 30 where the communication holes 31 and 32 do not reside. The second upstream pipe 210 and the second downstream pipe 220 may communicate through the second communication hole 32 of the valve member 30.

Accordingly, in this state, because the first flow path 100 and the third flow path 300 are blocked, the supply of air from the air supply source 12 to the spray nozzle 11 may be blocked. As a result, the venturi effect of the venturi section 101 is unable to be exerted in a state in which the first flow path 100 is blocked, even if the second flow path 200 is maintained in the open state. Thus, the supply of washing water from the washing water supply source 13 to the spray nozzle 11 may be cut off.

Figure 8:
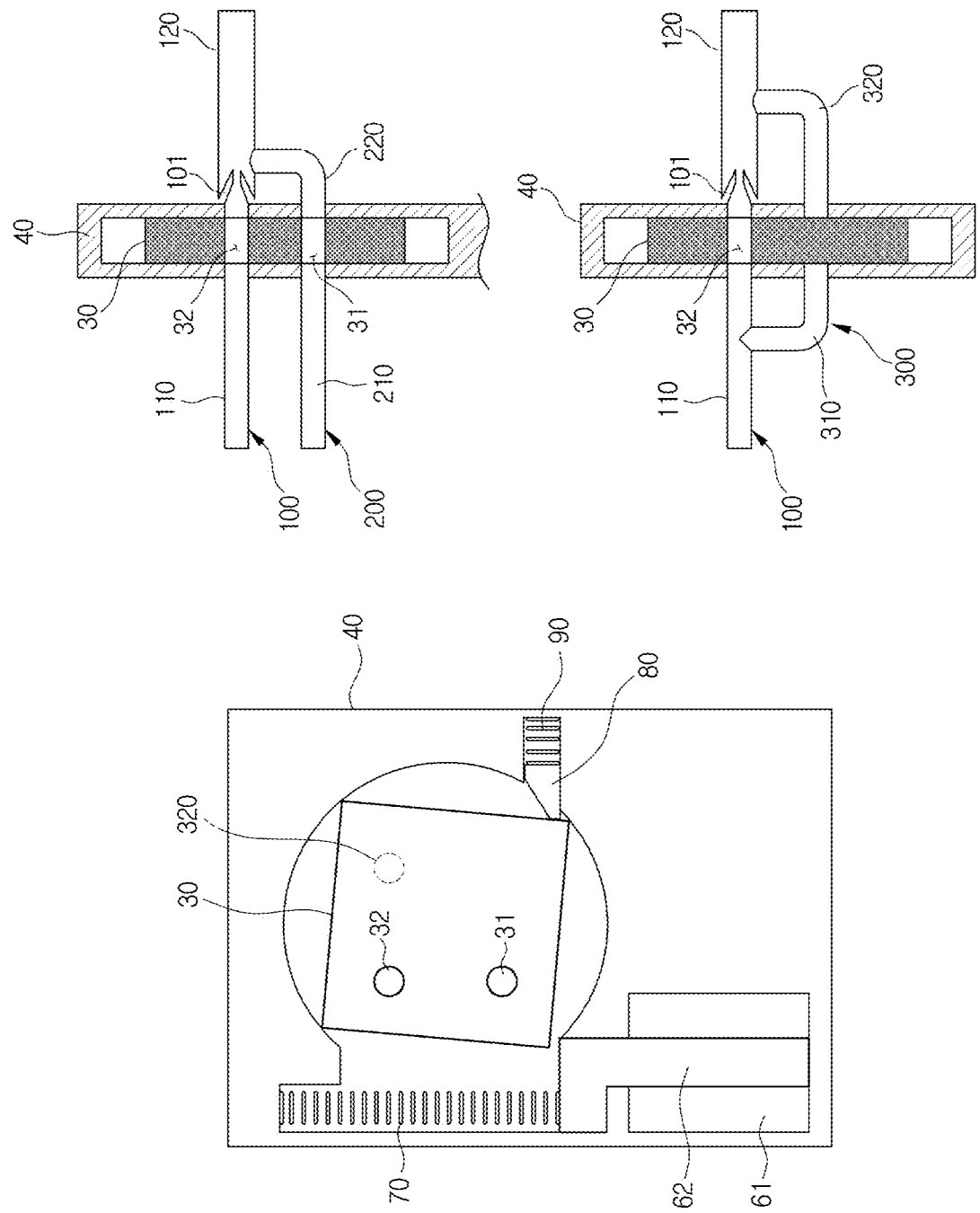
FIG. 8 is a view illustrating a case in which the fluid flow mode is a washing water supply mode in a sensor cleaning device according to an embodiment of the present disclosure.

FIG. 8 illustrates a structure in which the valve device 20 has switched the fluid flow mode from the blocking mode to the washing water supply mode. In this mode and orientation, the first and second communication holes 31, 32 are now positioned at a side portion, i.e., a left facing portion, of the valve member 30.

As shown in FIG. 8, the valve member 30 may communicate between the first upstream pipe 110 and the first downstream pipe 120 through the second communication hole 32 now positioned at the upper left side. Additionally, the valve member 30 may communicate between the second upstream pipe 210 and the second downstream pipe 220 through the first communication hole 31 positioned at the lower left side.

Accordingly, in this state, because the first flow path 100 and the second flow path 200 are opened, air from the air supply source 12 pumped through the pump 12a passes through the venturi section 101 and the spray nozzle 11 to then spray the sensor 1. Additionally, washing water from the washing water supply source 13 is suctioned into the venturi section 101 that exerts the venturi effect and in turn joins or combines with the flow of air supplied to the spray nozzle 11. As a result, the sensor 1 may be cleaned by the washing water.

Furthermore, the fluid communication between the third upstream pipe 310 and the third downstream pipe 320 is blocked in this mode through a right side of the upper portion of the valve member 30 where communication holes 31 and 32 do not reside. Thus, the third flow path 300 may be cut off. As a result, air from the air supply source 12 may be supplied to the spray nozzle 11 along the first flow path 100 without loss of the bypass to the third flow path 300. Accordingly, the venturi section 101 maintains a state in which the venturi effect for suctioning the washing water is maximized. Thus, the supplying of the washing water to the sensor 1 through the spray nozzle 11 may be smoother.

On the other hand, the air supply mode may include a first air supply mode and a second air supply mode.

Figure 9:
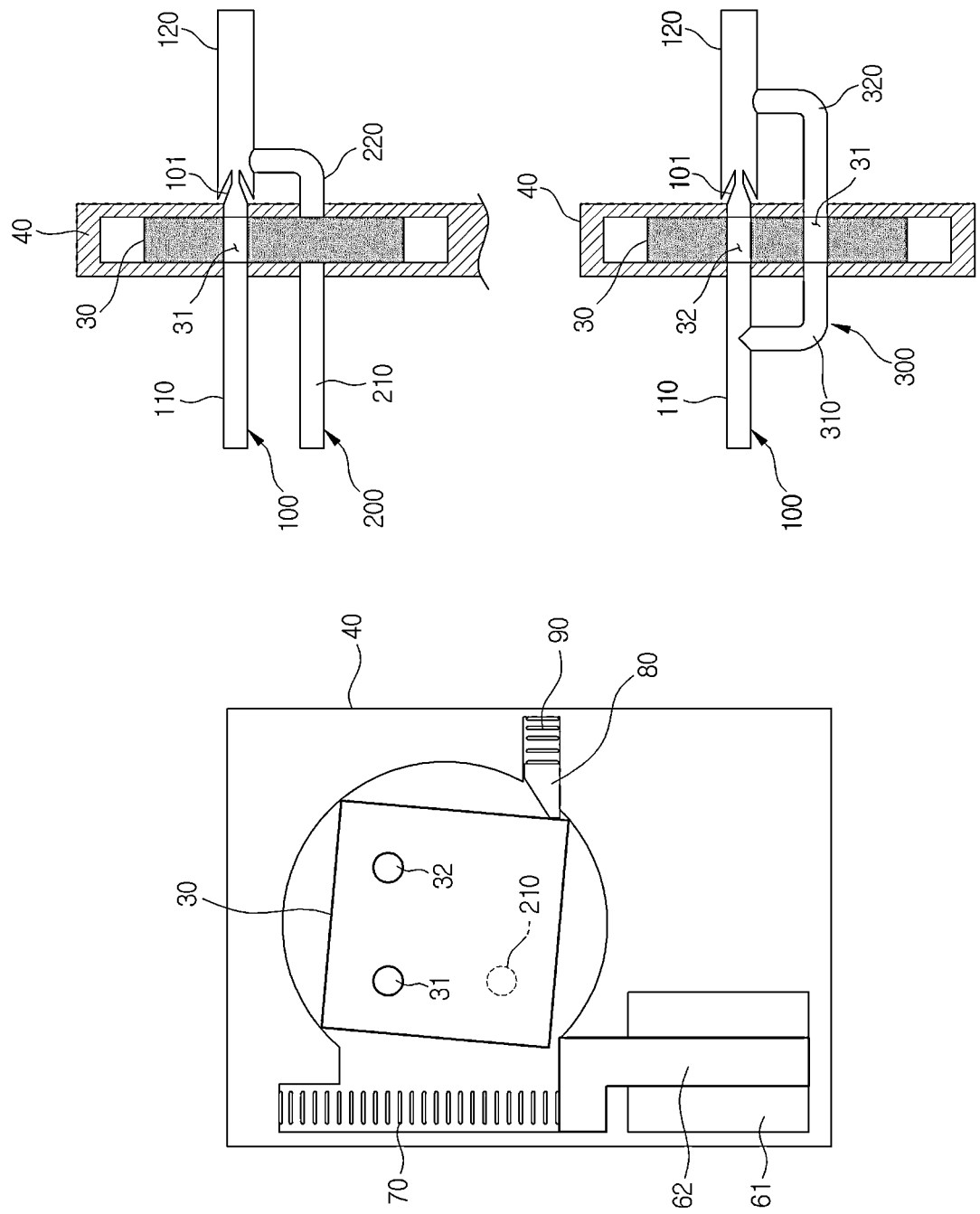
FIG. 9 is a view illustrating a case in which the fluid flow mode is a first air supply mode in a sensor cleaning device according to an embodiment of the present disclosure.

FIG. 9 illustrates a structure in which the valve device 30 has switched the fluid flow mode from the washing water supply mode to the first air supply mode. The fluid flow mode may be switched to the first air supply mode as the valve member 30 rotates 90 degrees clockwise from the washing water supply mode. In this mode and orientation, the first and second communication holes 31, 32 are now positioned at an upper portion, i.e., a top facing portion, of the valve member 30.

As shown in FIG. 9, in the first air supply mode, the first communication hole 31 and the second communication hole 32 of the valve member 30 are positioned on the upper side of the valve member 30 in this orientation, i.e., on both sides of the upper portion. In this state, the first communication hole 31 communicates with the first upstream pipe 110 and the first downstream pipe 120 to open the first flow path 100. The second communication hole 32 communicates with the third upstream pipe 310 and the third downstream pipe 320 to open the third flow path 300. However, the fluid communication between the second upstream pipe 210 and the second downstream pipe 220 is blocked by the left region of the lower part of the valve member 30 in which the communication holes 31 and 32 do not reside. As a result, the second flow path may be cut off.

Accordingly, in this state, air from the air supply source 12 is supplied to the spray nozzle 11 via the first flow path 100 and the third flow path 300 by the pump 12a, and in turn sprays the sensor 1 with air through the spray nozzle 11. The air sprayed to the sensor 1 may remove moisture that may remain in the sensor 1 after the cleaning process of the sensor 1.

Due to the second flow path 200 being maintained in the blocked state, the supply of washing water from the washing water supply source 13 to the spray nozzle 11 is blocked or prevented.

Figure 10:
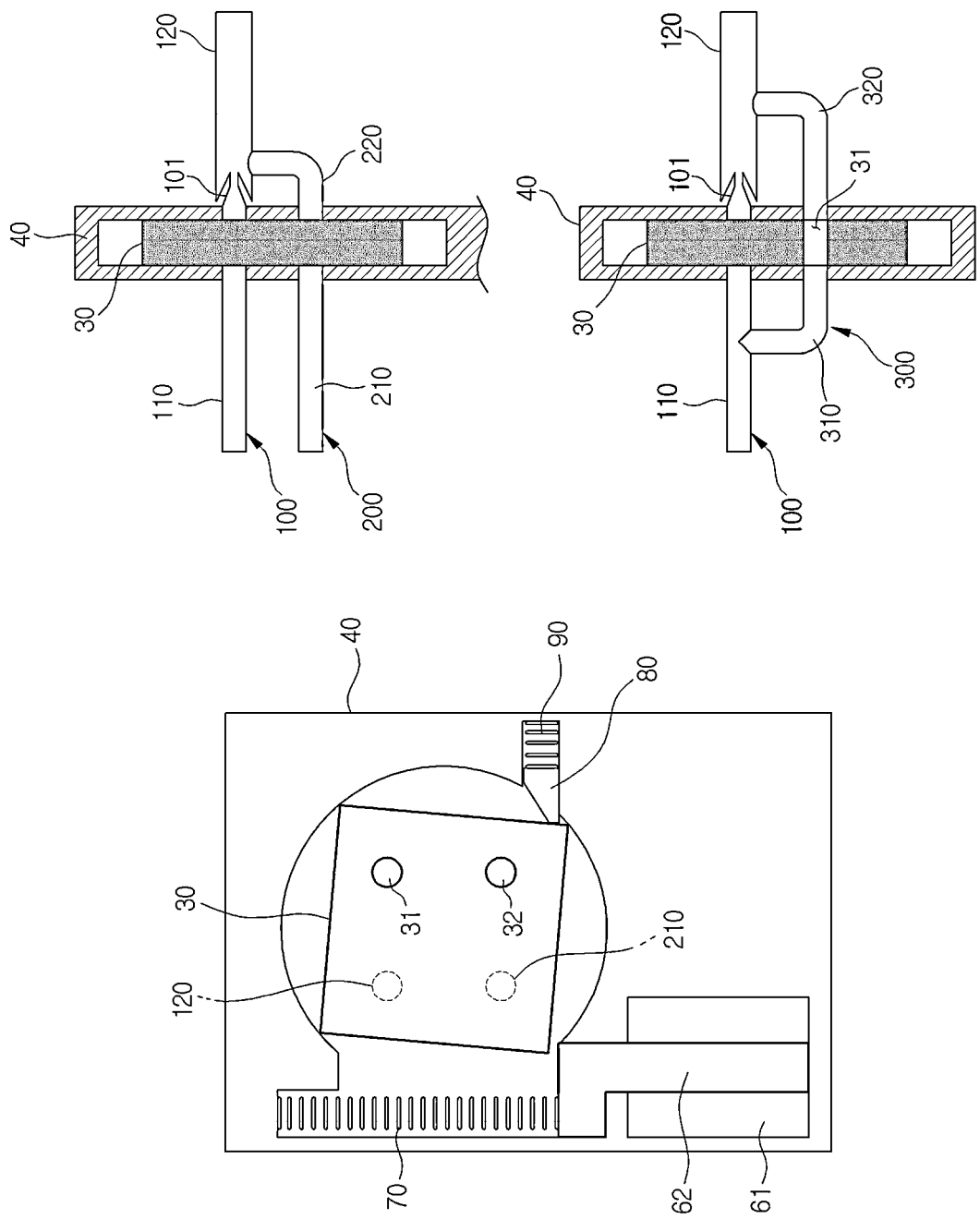
FIG. 10 is a view illustrating a case in which the fluid flow mode is a second air supply mode in a sensor cleaning device according to an embodiment of the present disclosure.

FIG. 10 illustrates a structure in which the valve device 20 has switched the fluid flow mode from the first air supply mode to the second air supply mode. The fluid flow mode may be switched from the first air supply mode to the second air supply mode as the valve member 30 rotates 90 degrees clockwise. In this mode and orientation, the first and second communication holes 31, 32 are now positioned at an opposite side portion, i.e., a right facing portion, of the valve member 30.

As shown in FIG. 10, in the second air supply mode, the first communication hole 31 and the second communication hole 32 of the valve member 30 are positioned at the upper and lower right sides. In this state, fluid communication between the first upstream pipe 110 and the first downstream pipe 120 and fluid communication between the second upstream pipe 210 and the second downstream pipe 220 are blocked by the left region of the valve member 30 in which the communication holes 31 and 32 do not exist. As a result, the first flow path 100 and the second flow path 200 may be cut off. However, the first communication hole 31 opens the fluid communication between the third upstream pipe 310 and the third downstream pipe 320, so that the third flow path 300 may maintain the open state.

Accordingly, in the second air supply mode, the flow of air supplied to the spray nozzle 11 passes only through the third flow path 300 without passing through the first flow path 100. As a result, because resistance by the venturi section 101 is reduced, the flow of air supplied to the spray nozzle 11 becomes smoother, and thus the spraying action of the air sprayed to the sensor 1 through the spray nozzle 11 is further increased.

Furthermore, in the air supply mode, it is possible to remove moisture inside the first flow path 100 and the second flow path 200 through which washing water flows. Accordingly, without using a heater, it is possible to effectively prevent dew condensation or freezing from occurring on the supply paths of water sprayed for cleaning the sensor 1.

When the second air supply mode has elapsed for a predetermined time, the valve device 20 allows the valve member 30 to be rotated 90 degrees clockwise again to reside in the blocking mode, thereby completing the cleaning action of the sensor 1.

As should be apparent from the above, various embodiments of the present disclosure may provide a sensor cleaning device configured for simplifying a supply structure of sprayed water and air for sensor cleaning.

Further, various embodiments of the present disclosure may provide a sensor cleaning device configured for effectively preventing dew condensation or freezing from occurring on the supply paths of water sprayed for sensor cleaning without using a heater.

As used herein, washing water is intended to be generic for cleaning liquid, which may include water or other liquid solutions suitable for cleaning sensors. The term is not intended to be limited only to water. Also, as can be seen in the drawings, the valve member 30 has a rectangular shape. When in one of the disclosed modes, the valve member body is tilted, i.e., it is not oriented with the sides vertical and the top and bottom horizontal, but instead with these surfaces or edges titled relative to horizontal and vertical. In these modes, the communication holes 31 and 32 are, however, either horizontally or vertically spaced from one another. Thus, the position of the communication holes 31 and 32 is rotationally offset relative to the valve member body.

Although embodiments of the disclosure have been shown and described, it should be appreciated by those having ordinary skill in the art that changes may be made in these embodiments without departing from the principles and spirit of the disclosure, the scope of which is defined in the claims and their equivalents.

What is claimed is:

1. A sensor cleaning device, comprising:
   a spray nozzle configured to spray washing water and air onto a sensor;
   a first flow path having a venturi section that exerts a venturi effect in a midstream portion thereof, the first flow path configured to guide air from an air supply source to the spray nozzle;
   a second flow path configured to provide fluid communication between a washing water supply source and the venturi section such that washing water is suctioned into the venturi section by the venturi effect, and to combine the washing water from the washing water supply source with a flow of air guided to the spray nozzle;
   a third flow path configured to fluidly communicate with the first flow path to bypass the venturi section; and
   a valve device configured to control a flow of fluid flowing along the first, second, and third flow paths to perform any one of multiple modes including
   a blocking mode in which a supply of washing water and air to the spray nozzle is blocked,
   a washing water supply mode in which the supply of washing water and air to the spray nozzle is allowed, and
   an air supply mode in which the supply of air is allowed while the supply of the washing water to the spray nozzle is blocked.

2. The sensor cleaning device of claim 1, wherein the valve device is configured to block the first flow path and the third flow path in the blocking mode.

3. The sensor cleaning device of claim 1, wherein the valve device is configured to, in the washing water supply mode, open the first flow path and the second flow path and block the third flow path.

4. The sensor cleaning device of claim 1, wherein the air supply mode further comprises:
   a first air supply mode in which the first flow path and third flow path are open and the second flow path is blocked; and
   a second air supply mode in which the first flow path and the second flow path are blocked and the third flow path is open.

5. The sensor cleaning device of claim 1, further comprising a contamination detection device configured to detect contamination of the sensor, wherein the valve device is configured to maintain the blocking mode until the contamination of the sensor is detected by the contamination detection device in which the washing water supply mode and the air supply mode are then sequentially performed.

6. The sensor cleaning device of claim 1, wherein:
   the first flow path includes a first upstream pipe forming an upstream path thereof and a first downstream pipe having the venturi section and forming a downstream path thereof;
   the second flow path includes a second upstream pipe forming an upstream path thereof and a second downstream pipe forming a downstream path thereof, wherein the second downstream pipe is connected to the first downstream pipe at a position downstream of the venturi section;
   the third flow path includes a third upstream pipe forming an upstream path thereof and connected to a midstream portion of the first upstream pipe, and a third downstream pipe forming a downstream path thereof and connected to the first downstream pipe at a position downstream of the venturi section; and
   the valve device includes a valve member and a valve body having an accommodating space to accommodate the valve member,
   wherein the valve body includes
      a plurality of first coupling holes disposed on one side of the accommodating space so that downstream ends of the first upstream pipe, the second upstream pipe, and the third upstream pipe are coupled to the valve body, respectively, and
      a plurality of second couplings holes disposed on another side of the accommodating space so that upstream ends of the first downstream pipe, the second downstream pipe, and the third downstream pipe are coupled to the valve body, respectively, and positioned to correspond to positions of the plurality of first coupling holes, and
   wherein the valve member includes at least one pair of communication holes through which the first coupling holes and the second coupling holes communicate with each other, the valve member being rotatably accommodated in the accommodating space.

7. The sensor cleaning device of claim 6, wherein the plurality of first coupling holes, the plurality of second coupling holes, and the pair of communication holes are disposed to form 90-degree intervals from each other along a circumference of a rotation center of the valve member.

8. The sensor cleaning device of claim 7, wherein the valve device further includes a valve driver configured to rotate and drive the valve member by 90 degrees in one direction in order to switch among the multiple modes.

9. The sensor cleaning device of claim 8, wherein the valve driver comprises:
   a solenoid valve having a coil and a plunger, wherein the plunger is configured to move in one direction by electromagnetic interaction with the coil to rotate the valve member when power is applied to the coil; and a return member configured to elastically support the plunger and return the plunger to an original position in a state in which power to the coil is cut off.

10. The sensor cleaning device of claim 9, wherein:

the valve member is provided in a rectangular plate shape inclined so that a lower part of one side thereof is positioned higher than a lower part of the other side thereof in a state in which any one of the multiple modes is maintained; and the plunger is positioned at the lower part of one side of the valve member when any one of the multiple modes is maintained and is configured to push the lower part of one side of the valve member upward when switching to another one of the multiple mode.

11. The sensor cleaning device of claim 10, wherein:

the plunger further includes a body for moving the valve member and an extension portion that is bent and extends from the body to block contact with the valve member; and the return member elastically supports the extension portion.

12. The sensor cleaning device of claim 10, wherein:

a first locking portion and a second locking portion are provided on an outer surface of the valve member and an inner surface of the accommodating space, respectively to engage with each other; and the first locking portion and the second locking portion are configured to engage with each other in a state of maintaining any one of the multiple modes so that a posture of the valve member is maintained.

13. The sensor cleaning device of claim 12, wherein engagement between the first locking portion and the second locking portion is released by a rotational force of the valve member rotated by the plunger.

14. The sensor cleaning device of claim 10, wherein the valve device further comprises:

a pressing member configured to press and support a side of the valve member; and an elastic member configured to elastically support the pressing member in a direction of the valve member, wherein the pressing member presses and rotates the valve member such that a posture of the valve member is switched to a state where one of the multiple modes is maintained when mode switching of the valve member is completed.

15. The sensor cleaning device of claim 14, wherein the pressing member comprises:

a pressure surface configured to support and press the side of the valve member; and an inclined surface configured to rotatably support a corner of the valve member to guide the side of the valve member to be supported on the pressure surface.

16. The sensor cleaning device of claim 14, wherein:

a first locking portion and a second locking portion are provided on an outer surface of the valve member and an inner surface of the accommodating space, respectively, and configured to engage with each other;

the first locking portion and the second locking portion are configured to engage with each other in a state of maintaining any one of the multiple modes so that a posture of the valve member is maintained; and the pressing member presses and rotates the valve member so that the first locking portion and second locking portion are engaged with each other.

17. The sensor cleaning device of claim 1, further comprising:

a distributor disposed between the spray nozzle and the first flow path; and a plurality of the spray nozzles to clean a plurality of sensors, the plurality of the spray nozzles being branched from the distributor.

* * * * *